US011913480B2

(12) United States Patent
Befus

(10) Patent No.: US 11,913,480 B2
(45) Date of Patent: Feb. 27, 2024

(54) INTEGRATED PRESSURE DIAGNOSTIC FOR OFF-HIGHWAY STEERING ISOLATION CIRCUIT

(71) Applicant: Danfoss A/S, Nordborg (DK)

(72) Inventor: Kenneth Marshall Befus, Minneapolis, MN (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 17/795,651

(22) PCT Filed: Dec. 30, 2020

(86) PCT No.: PCT/EP2020/025601
§ 371 (c)(1),
(2) Date: Jul. 27, 2022

(87) PCT Pub. No.: WO2021/151457
PCT Pub. Date: Aug. 5, 2021

(65) Prior Publication Data
US 2023/0063904 A1    Mar. 2, 2023

Related U.S. Application Data

(60) Provisional application No. 62/968,745, filed on Jan. 31, 2020.

(51) Int. Cl.
*B62D 5/08* (2006.01)
*B62D 5/06* (2006.01)
(Continued)

(52) U.S. Cl.
CPC ............ *F15B 19/005* (2013.01); *B62D 5/062* (2013.01); *B62D 5/08* (2013.01); *B62D 5/09* (2013.01); *F15B 13/02* (2013.01)

(58) Field of Classification Search
CPC . B62D 5/062; B62D 5/09; F15B 13/02; F15B 19/005; F15B 2211/5059
See application file for complete search history.

(56) References Cited

FOREIGN PATENT DOCUMENTS

| DE | 10 2017 106 634 A1 | 10/2018 |
|----|---------------------|---------|
| EP | 3 173 311 A1        | 5/2017  |
| WO | 2006/048453 A1      | 5/2006  |

OTHER PUBLICATIONS

International Search Report and Written Opinion of the International Searching Authority for International Patent Application No. PCT/EP2020/025601 dated Mar. 22, 2021, 12 pages.

*Primary Examiner* — Kenneth Bomberg
*Assistant Examiner* — Daniel S Collins
(74) *Attorney, Agent, or Firm* — Merchant & Gould P.C.

(57) ABSTRACT

A system and method for detecting the functional state of a piloted or direct-operated isolation valve in a hydraulic circuit is presented. In some examples the hydraulic circuit is a steering circuit and the isolation valve provides selective isolation between a hydraulic actuator and one or more metering valves. In some examples, the isolation valve assembly is movable between a first position, in which fluid flow between the metering valve and the actuator is enabled, and a second position, in which fluid flow between the metering valve and the actuator is blocked. When the isolation valve assembly is moved to one of the first and second positions, an inlet port and a pressure sensing port of the isolation valve assembly are placed in fluid communication with each other. When the isolation valve assembly is moved to the other of the first or second position, a second inlet port and the pressure sensing port are placed in fluid communication.

18 Claims, 6 Drawing Sheets

(51) Int. Cl.
*B62D 5/09* (2006.01)
*F15B 13/02* (2006.01)
*F15B 19/00* (2006.01)

INTEGRATED PRESSURE DIAGNOSTIC FOR OFF-HIGHWAY STEERING ISOLATION CIRCUIT

CROSS-REFERENCE TO RELATED APPLICATION

This application is a National Stage Application of PCT/EP2020/025601, filed on Dec. 30, 2020, which claims the benefit of U.S. Patent Application Ser. No. 62/968,745, filed on Jan. 31, 2020, the disclosures of which are incorporated herein by reference in their entireties. To the extent appropriate, a claim of priority is made to each of the above disclosed applications.

BACKGROUND

Work machines, such as off-highway vehicles, fork lifts, wheel loaders, track loaders, excavators, backhoes, bull dozers, and telehandlers are known. Work machines can be used to move material, such as pallets, dirt, and/or debris. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. Work machines are commonly provided with electronic control systems that rely upon a number of inputs and outputs, for example, pressure sensors, position sensors, and valve actuators. Electro-hydraulic valves often rely on sensed values, such as port pressure and/or valve position to provide a stable, controlled flow to and from a hydraulic actuator, such as a linear actuator or motor. To accurately control such valves, fluid properties must generally be input into the control system.

Some hydraulic systems, for example some electro-hydraulic steering systems, require a specified level of functional safety (e.g. Performance Level (PL), Safety Integrity Level (SIL), agricultural performance level (AgPL), etc.). Such systems typically employ methods to detect the functional state of safety elements. Real-time fault detection on safety elements can improve the overall safety rating for the system by reducing the number of dangerous faults which would remain undetected in the event of their failure. Oftentimes, the state of isolation functions on electro-hydraulic steering systems must be checked by way of a proxy or verification of flow downstream from the isolation spool. Such approaches can be undesirable as, in many cases, the system requires that wheel movement on the machine be verified (i.e. during machine startup). Improvements are desired.

SUMMARY

This disclosure describes a method (hydraulic circuit) for detecting the functional state of a piloted or direct-operated isolation valve which is used to isolate flow output from an electro-hydraulic steering valve. The combination of an integrated diagnostic pressure signal and pressure sensor (i.e. pressure switch) is used to achieve real-time fault detection of the isolation element (i.e. pilot spool valve). This fault detection capability can be employed to raise the diagnostic coverage of the element in accordance with ISO 13849 and IEC 61508. Direct measurement of the isolation functionality is preferable as it eliminates the need for undesirable conditions (such as wheel movement) during startup or normal operation. This disclosure presents a method of real-time detection for flow isolation valves which does not rely on moving parts of a machine's steering system.

In safety-applicable systems, it is often necessary to verify the functionality of the isolation valve (and pilot) at all times. It is common for the defined "safe state" of the system to be one in which the isolation valve is closed and there is no flow to and from the steering cylinders. One way to directly detect the isolation valve state is to measure the state using a spool position sensor, but another method is presented herein which involves an isolation valve design allowing for the valve state to be determined using a diagnostic pressure signal. A 7-way/2-position isolation valve acts as a blocking valve for flow between the main-stage spool and the cylinder(s). An additional output pressure signal path (diagnostic signal) connects a dedicated diagnostic signal port to tank pressure when in the closed state (not actuated) and to reduced pilot pressure supply when in the open state (actuated). When the isolation valve is in the unactuated state (isolating), the pressure at the diagnostic port will be equal to tank pressure. When the isolation valve is in the actuated state (flowing), the pressure at the diagnostic port will be equal to reduced pilot supply pressure. The difference between the diagnostic port pressure in each of these two states is generally constant and roughly equal to the PRV pressure setting. Tank pressure variation will affect this somewhat but should be negligible compared to the PRV pressure.

In application, the concepts disclosed herein can be used to detect the state of the isolation valve at any given time. Given the situation when the isolation valve is stuck (or perhaps its pilot valve is stuck), the high-ranking system compares the command signal (i.e. PWM, current, etc.) with the measured pressure at the diagnostic port and determines that a failure has occurred which requires the system to take action (go to "safe" state). The failure would otherwise go undetected until a different part of the system detected the failure or a hazardous situation arose. As stated above, the advent of a diagnostic pressure signal for the isolation valve will allow a higher "diagnostic coverage," known as "DC" per ISO 13849 and IEC 61508, to be claimed for the isolation valve component. This could increase the overall PL or SIL of the system in some cases.

In one example, a hydraulic circuit includes an actuator having first and second ports, a metering valve assembly for controlling hydraulic flow into and out of the first and second ports, and an isolation valve assembly located between the actuator and the metering valve assembly, the isolation valve assembly including a first inlet port configured for fluid communication with a pressure source of the hydraulic circuit, a second inlet port configured for connection with a reservoir of the hydraulic circuit, and a pressure sensing port configured for connection with a pressure sensor. In one aspect, the isolation valve assembly is movable between a first position in which fluid flow between the metering valve and the actuator is enabled and a second position in which fluid flow between the metering valve and the actuator is blocked. When the isolation valve assembly is moved to one of the first and second positions, the first inlet port and the pressure sensing port are placed in fluid communication with each other and wherein when the isolation valve assembly is moved to the other of the first or second position, the second inlet port and the pressure sensing port are placed in fluid communication.

The system at hand represents a typical electro-hydraulic steering circuit for off-highway vehicles in which a pilot-operated proportional metering valve is used to meter flow to and from a set of one or more steering cylinders. The metering valve may be an open-center, closed center, or load-sensing (static or dynamic signal) valve. The system includes the use of a normally-closed isolation valve which blocks flow between the metering valve and steering cylinder(s). The isolation valve may be directly piloted (using solenoid coil) or hydraulically piloted (using pilot valve). In normal operation, the isolation valve is actuated to allow flow to pass between the metering valve and steering cylinders.

In some examples, the isolation valve assembly is a spool valve assembly.

In some examples, when the isolation valve assembly is moved to the first position, the first inlet port and the pressure sensing port are placed in fluid communication with each other and wherein when the isolation valve assembly is moved to the second position, the second inlet port and the pressure sensing port are placed in fluid communication.

In some examples, the isolation valve assembly is spring biased into one of the first and second positions.

In some examples, the isolation valve assembly is spring biased into the second position.

In some examples, the isolation valve assembly is actuated towards the second position by a solenoid actuator.

In some examples, the isolation valve assembly further includes a pilot valve assembly for selectively directing pressurized fluid to move the isolation valve assembly towards the second position.

In some examples, the isolation valve assembly further includes a pressure sensor connected to the pressure sensing port.

In one example, an isolation valve assembly for use in a hydraulic circuit includes first and second ports configured for fluid communication with a metering valve assembly, third and fourth ports configured for fluid communication with an actuator, a fifth port configured for fluid communication with a pump side of the hydraulic circuit, a sixth port configured for fluid communication with a reservoir side of the hydraulic circuit, and a seventh port configured for fluid communication with a pressure sensor. When the isolation valve is in a first position, the first and third ports are placed in fluid communication with each other, the second and fourth ports are placed in fluid communication with each other, the fifth and seventh ports are placed in fluid communication with each other, and the sixth port is blocked. When the isolation valve is in a second position, the first through fifth ports are blocked and the sixth and seventh ports are placed in fluid communication with each other.

In some examples, the isolation valve assembly is a spool and sleeve type valve.

In some examples, the isolation valve assembly is spring biased towards the second position.

In one example, a method for determining a functional state of an isolation valve assembly includes the steps of providing an isolation valve assembly in a hydraulic circuit that is movable between a first position in which fluid flow between a metering valve and an actuator is enabled and a second position in which fluid flow between the metering valve and the actuator is blocked, initiating an operation verification routine for the isolation valve assembly, reading a first diagnostic pressure value with the isolation valve assembly in a first position, moving the isolation valve assembly to a second position, reading a second diagnostic pressure value with the isolation valve assembly in the second position, and determining whether the isolation valve assembly is functional by comparing the first diagnostic pressure value to the second diagnostic pressure value.

In some examples, the first position corresponds to a position in which the isolation valve assembly blocks flow between the metering valve and the actuator.

In some examples, the second position corresponds to a position in which the isolation valve assembly enables flow between the metering valve and the actuator.

In some examples, the step of reading a first diagnostic pressure value includes sensing a pressure associated with a reservoir of the hydraulic circuit.

In some examples, the step of reading a second diagnostic pressure value includes sensing a pressure associated with a pump side of the hydraulic circuit.

In some examples, the first position corresponds to a position in which the isolation valve assembly blocks flow between the metering valve and the actuator and the second position corresponds to a position in which the isolation valve assembly enables flow between the metering valve and the actuator.

In some examples, the determining step includes comparing the difference between the first and second diagnostic pressure values.

In some examples, the determining includes identifying the isolation valve assembly as being in a failed state when the difference between the first and second diagnostic pressure values is below a threshold value.

In some examples, the threshold is a predetermined threshold value.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
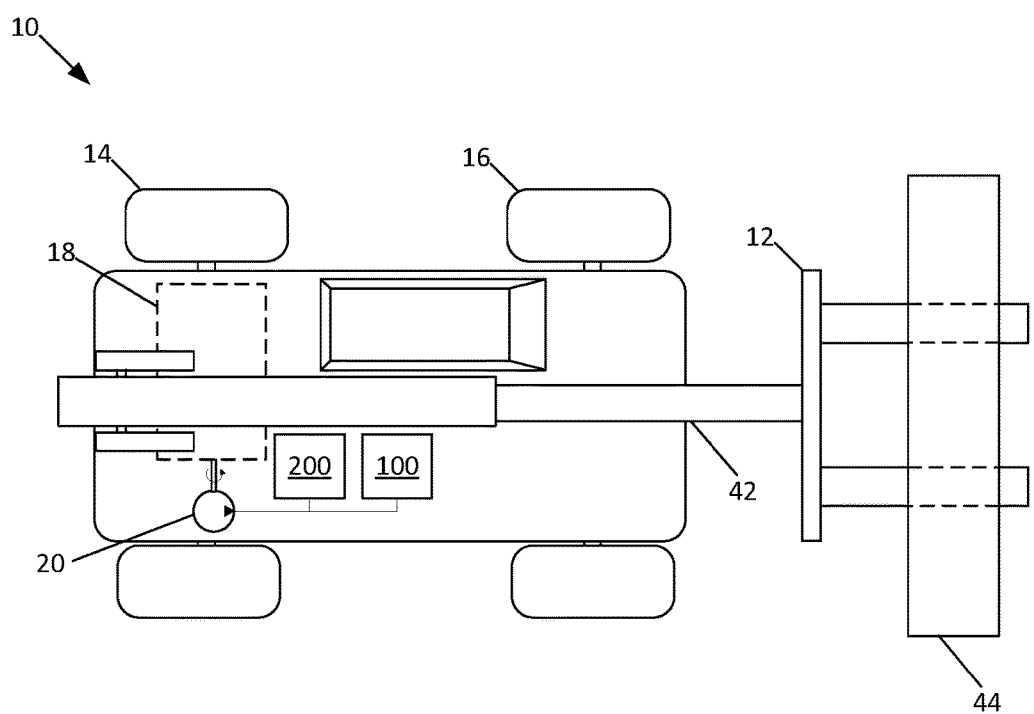
FIG. 1 is a schematic view of a work machine having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Descriptions of a general system, an associated hydraulic system, related control systems, and methods follow.

General System Description

As depicted at FIG. 1, a work machine 10 is shown. Work machine 10 includes a work attachment 12 for performing a variety of lifting tasks associated with a load 44. In one embodiment, work machine 10 is a telehandler having a telescoping boom 42 that supports the work attachment 12. In one embodiment, the work attachment 12 includes a pair of forks. However, one skilled in the art will appreciate that work attachment may be any hydraulically powered work implement.

Work machine 10 is also shown as including at least one drive wheel 14 and at least one steer wheel 16. In certain embodiments, one or more drive wheels 14 may be combined with one or more steer wheels 16. The drive wheels are powered by a power plant 18, for example an electric motor or an internal combustion engine. The power plant 18 is also configured to power a hydraulic system including a steering circuit 100 and a work circuit 200 of the work machine 10 via at least one hydraulic pump 20. In one embodiment, pump 20 is mechanically coupled to the power plant 18, such as by an output shaft or a power take-off. In one embodiment, pump 20 is powered indirectly by the power plant 18 via a hydraulic system with a hydraulic motor. The steering circuit 100 is controlled by operation of the pump 20 in cooperation with a number of hydraulic actuators and control valves. Likewise, the work circuit 200 actuates the work attachment 12 by operation of the pump in cooperation with a number of hydraulic actuators and control valves. In one embodiment, the work machine includes hydraulic actuators and valves for effectuating steering in addition to lifting, extending, tilting, and sideways motions of the work attachment 12, powered by the work circuit 200.

Hydraulic System

Figure 2:
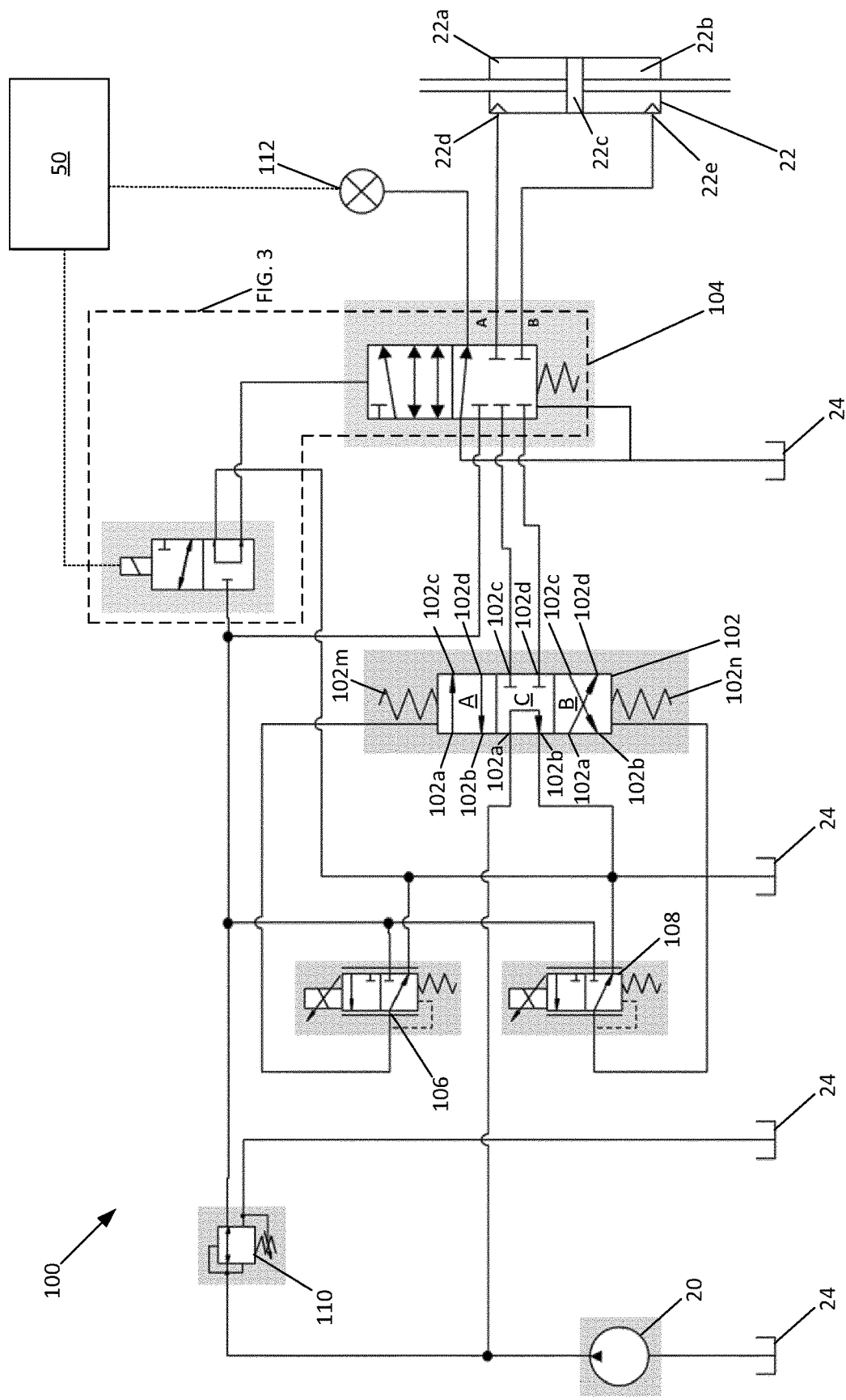
FIG. 2 is a schematic view of a portion of an electro-hydraulic system including a steering circuit and actuator suitable for use in the work machine shown in FIG. 1.

Referring to FIG. 2, an example of a steering circuit 100 of the work machine 10 is shown. Steering circuit 100 is for controlling the steering of the work machine 10 via one or more actuators 22. As depicted the actuator 22 is shown as being a linear acting actuator. However, the disclosure is not limited to only this type of actuator and can be used with other types of actuators, such as rotary type actuators. As depicted, the steering circuit 100 also includes a metering valve assembly 102, an isolation valve assembly 104, first and second pressure reducing valve assemblies 106, 108, a and a pressure reference valve assembly 110. Various interconnecting hydraulic passageways and/or lines are also provided with the steering circuit 100. The steering circuit 100 is also connected to the hydraulic pump 20 and a reservoir or tank 24.

In one aspect, the hydraulic actuator 22 includes a first chamber 22a and a second chamber 22b separated by a piston 22c. The hydraulic actuator 22 is shown as further including a first port 22d in fluid communication with the first chamber 22a and a second port 22e in fluid communication with the second chamber 22b. Accordingly, as fluid enters the first chamber 22a via the first port 22d, the piston 22c is forced in a first direction which in turn causes fluid to exit the second chamber 22b via the second port 22e. Likewise, as fluid enters the second chamber 22b via the second port 22e, the piston is forced in a second direction opposite the first direction which in turn causes fluid to exit the first chamber 22a. In one aspect, the first direction is associated with steering the work machine 10 in one direction while the second direction is associated with steering the work machine 10 in the opposite direction.

Fluid into and out of the ports 22d, 22e of the actuator 22 is controlled by the metering valve assembly 102. In operation, the metering valve assembly 102 selectively places pumped fluid from the pump 20 with either the first or second chamber 22a, 22b via the first or second port 22d, 22e and also selectively places the other chamber 22a, 22b via the first or second port 22d, 22e in fluid communication with the tank or reservoir 24 such that fluid can exit the opposite chamber 22a, 22b. As shown, the metering valve assembly 102 is a three position, four-way valve having ports 102a through 102d. In the first position A of the metering valve assembly 102, pumped fluid from the pump 20 flows through ports 102a, 102c of the metering valve assembly 102 and into the first chamber 22a via port 22d to drive the piston 22c in the first direction. Concurrently, fluid exiting the second chamber 22b via port 22e flows through ports 102b, 102d of the metering valve assembly 102 and to the reservoir or tank 24. In a second position B of the metering valve assembly, pumped fluid from the pump 20 flows through ports 102a, 102d of the metering valve assembly 102 and into the second chamber 22b via port 22e to drive the piston 22c in the second direction. Concurrently, fluid exiting the first chamber 22a via port 22d flows through ports 102b, 102e of the metering valve assembly 102 and to the reservoir or tank 24. In the third position C of the metering valve assembly 102, which is the neutral or open center position, fluid flow out of the chambers 22a, 22b of the actuator 22 is blocked at ports 102c, 102d of the metering valve assembly 102 while ports 102a, 102b redirect pumped fluid from the pump 20. In the example shown, the pressure reducing pilot valves 106, 108 are provided to provide pilot pressure to move the metering valve assembly 102 into the first or second positions A, B while centering springs 102m, 102n bias the metering valve assembly 102 into the center or neutral position C. Although a particular metering and pilot valve assembly is shown, other arrangements are possible. For example, the metering valve assembly 102 could also be configured to have a closed-center or configured as a load-sensing (static or dynamic) proportional metering valve utilizing, for example, variable solenoid actuators instead of hydraulic pilot pressure.

With continued reference to FIG. 2, the steering circuit 100 is shown as further including an isolation valve assembly 104. As arranged, the isolation valve assembly 104 is located between the metering valve assembly 102 and the actuator 22. Accordingly, the isolation valve assembly 104 can operate to block fluid into and out of the actuator chambers 22a, 22b regardless of the position of the metering valve assembly 102. The isolation valve assembly 104 can thus provide a safety function in the event of an operational fault associated with the metering valve assembly 102 and/or related components, whereby the position of the actuator 22 is safely held in place and prevented from moving until the fault is resolved.

Figure 3:
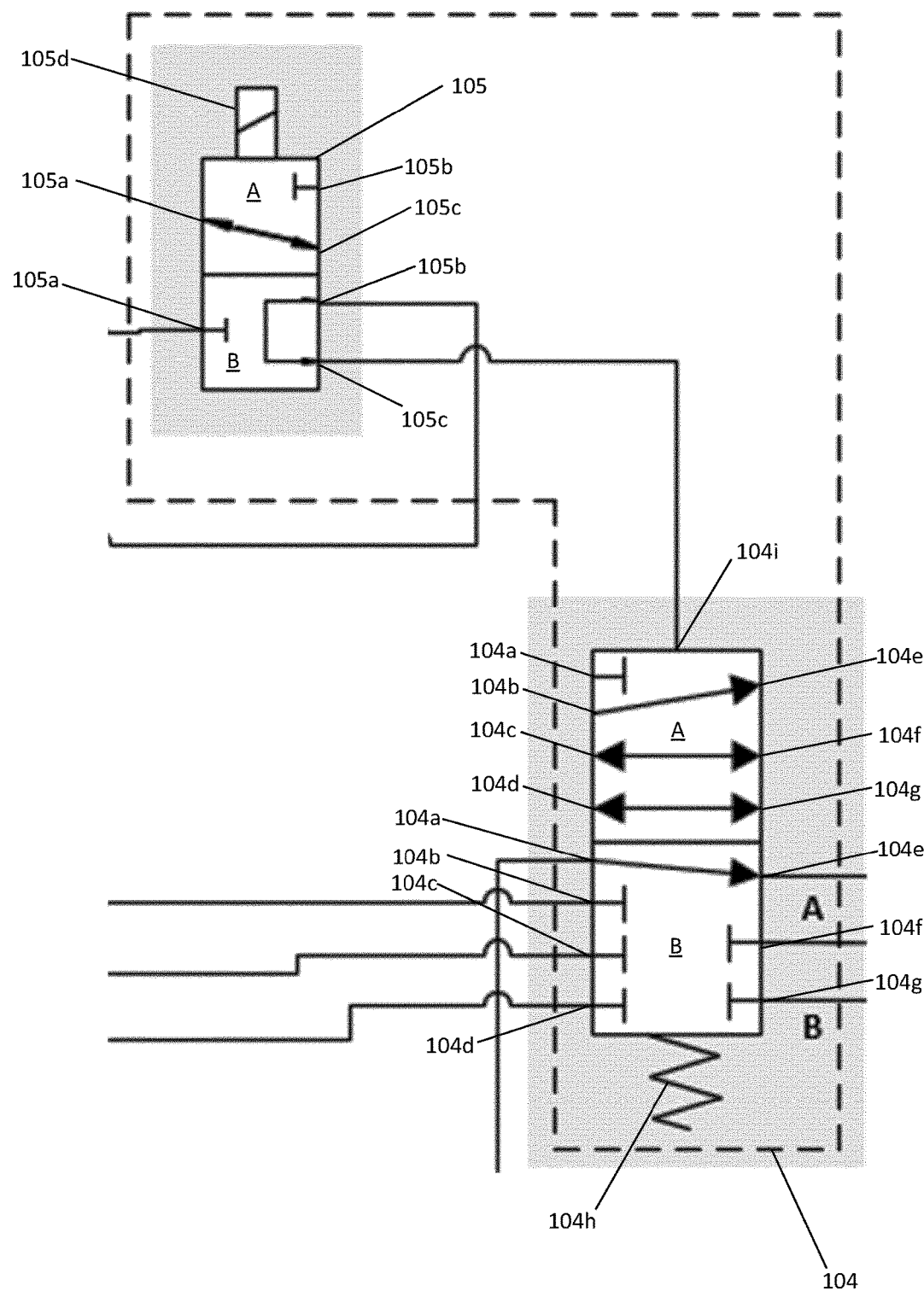
FIG. 3 is a schematic view of a portion of the system shown in FIG. 2.

As most easily viewed at FIG. 3, the isolation valve assembly 104 is a two-position, seven-way valve having ports 104a through 104g. In a first position A of the isolation valve assembly 104, the port 104a is blocked; the ports 104b and 104e are connected to each other such that fluid communication is opened between the pressure referencing valve assembly 110 and a pressure sensor 112; the ports 104c and 104f are open to each other such that fluid communication is opened between the actuator port 22d and the port 102k of the metering valve assembly 102; and the ports 104d and 104g are open to each other such that fluid communication is opened between the actuator port 22e and the port 102l of the metering valve assembly 102. In a second position B of the isolation valve assembly 104, the ports 104a and 104e are open to each other such that fluid communication is opened between the tank or reservoir 24 and the pressure sensor 112 while the remaining ports 104b, 104c, 104d, 104f, and 104g are blocked.

In the example shown at FIGS. 2 and 3, the isolation valve assembly 104 is biased toward the second position B by a biasing spring 104h and is operated toward the first position A by a pilot valve assembly 105 acting on an end 104i of the isolation valve assembly 104. As shown, the pilot valve assembly 105 is a three-way, two position valve having ports 105a to 105c. In a first position A of the pilot valve assembly 105, the ports 105a and 105c are connected to each other such that fluid communication is opened between the pressure reducing valve assembly 110 and the end 104i of the isolation valve assembly 104 and such that the port 105b is blocked. Accordingly, in the first position A of the pilot valve assembly 105, fluid pressure equivalent to the downstream side of the pressure reducing valve assembly 100 acts on the end of the isolation valve assembly 104 to move the isolation valve assembly 104 to the first position A. In a second position B of the pilot valve assembly 105, the port 105a is blocked while the ports 105b and 105c are connected to each other such that fluid communication is open between the reservoir or tank 24 and the end 104i of the isolation valve assembly 104. Accordingly, in the second position B of the pilot valve assembly 105, the spring force from the spring 104h is greater than any force generated by the fluid pressure from the tank or reservoir 24, thereby allowing the spring 104h to act on the end of the isolation valve assembly 104 to move the isolation valve assembly 104 to the second position B. In the example shown, the pilot valve assembly 105 is operated between the positions A and B by an actuator 105d, such as a variable solenoid. Although not shown, a spring may be provided on the opposite end to bias the pilot valve assembly 105 into the second position B.

Figure 4:
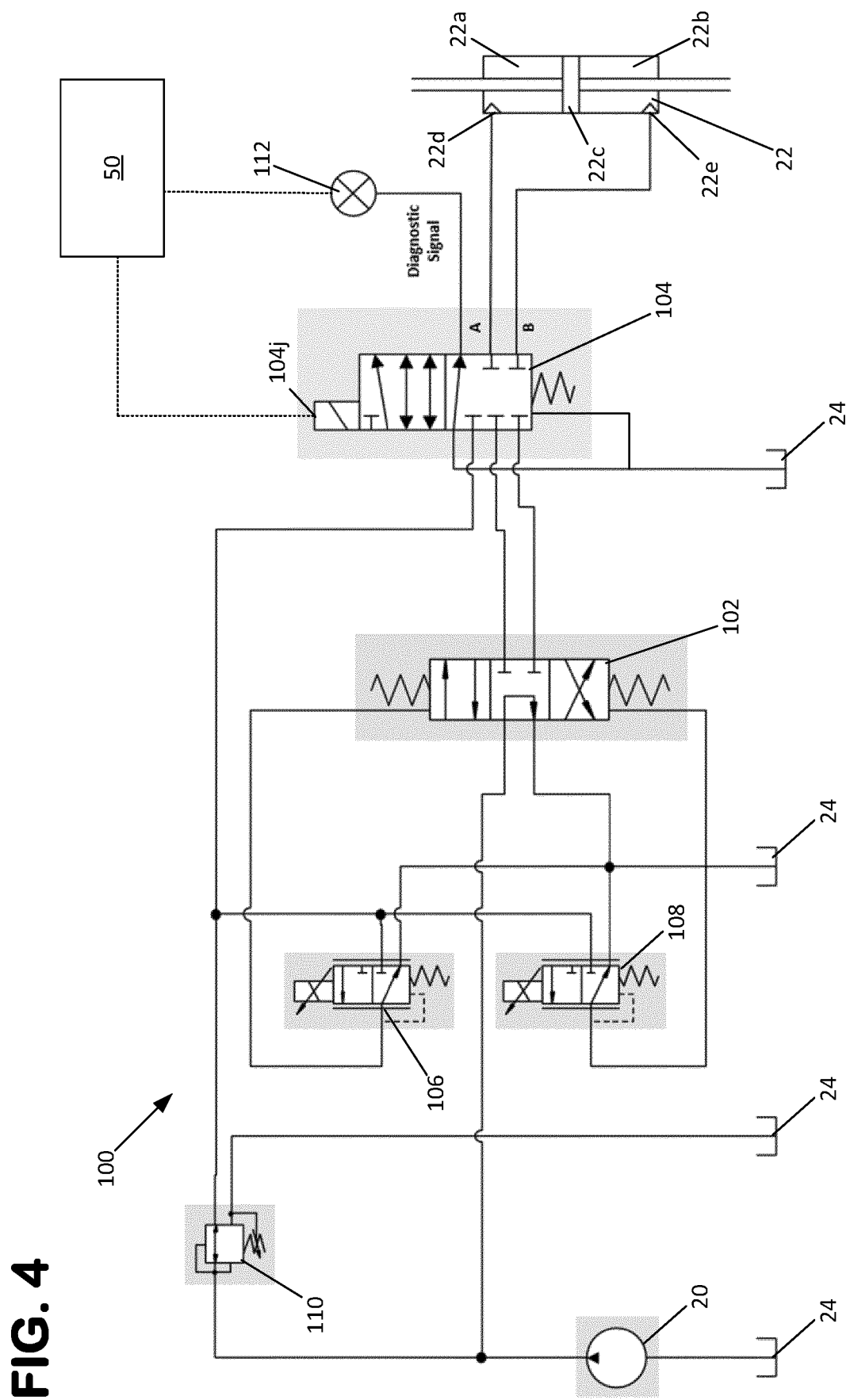
FIG. 4 is a schematic of a variation of the portion of the electro-hydraulic system shown in FIG. 2.

In an alternative example, the isolation valve assembly 104 can be provided without a pilot valve assembly 105. Such an example is shown at FIG. 4, wherein the steering circuit 100 is shown as being the same as depicted in FIG. 2, but with the exception that the isolation valve assembly 104 is provided with an actuator 104j, such as a solenoid, instead of the pilot valve assembly 105. Accordingly, the actuator 104j can be energized to operate the isolation valve assembly towards the first position A.

In the depicted examples, the valve assemblies 102, 104, 105, 106, and 108 are generally shown as being sleeve and spool type valve assemblies. However, other types of valve assemblies may be used without departing from the concepts presented herein. Additionally, while the valve assemblies are schematically shown as separate valve assemblies, some or all of the depicted valve assemblies can be provided in a single physical housing assembly, optionally including other valve assemblies associated with the work circuits 200. In some examples, multiple housing assemblies are assembled together such that all of the valves associated with the work and steering sections are provided as an overall assembly, as is the case for some models of the Eaton CMA Advanced Mobile Valve. It is also noted that the use of the isolation valve assembly 104 is not limited to use in conjunction with a single metering valve assembly 102 for a steering application. For example, the isolation valve assembly 104 could be used with two independent metering valves, for example two three-position, three-way valves, with one valve controlling flow into and out of the actuator port 22d and the other valve controlling flow into and out of the actuator port 22e. For example, the isolation valve assembly 104 could be used with an actuator associated with a section of the work circuit 200 (e.g. a lift, tilt, or side actuator) or with another portion of the work machine 10, such as with a brake circuit.

The Electronic Control System

Figure 5:
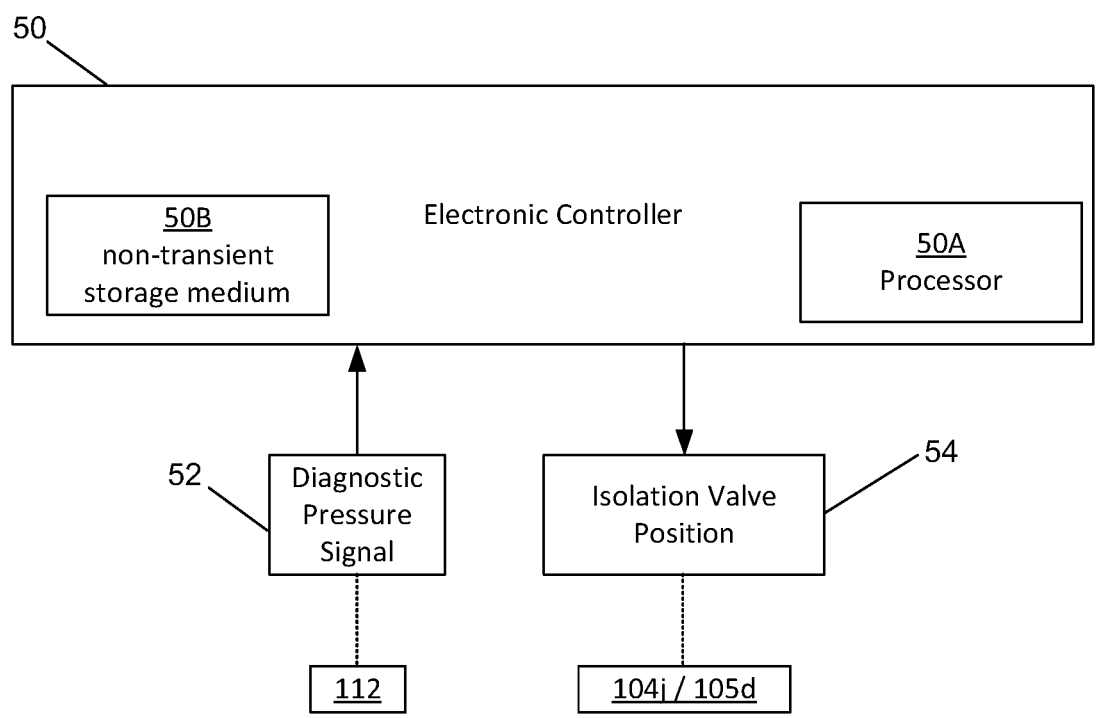
FIG. 5 is a schematic of an electronic control system for the hydraulic circuit shown in FIG. 2.
Figure 6:
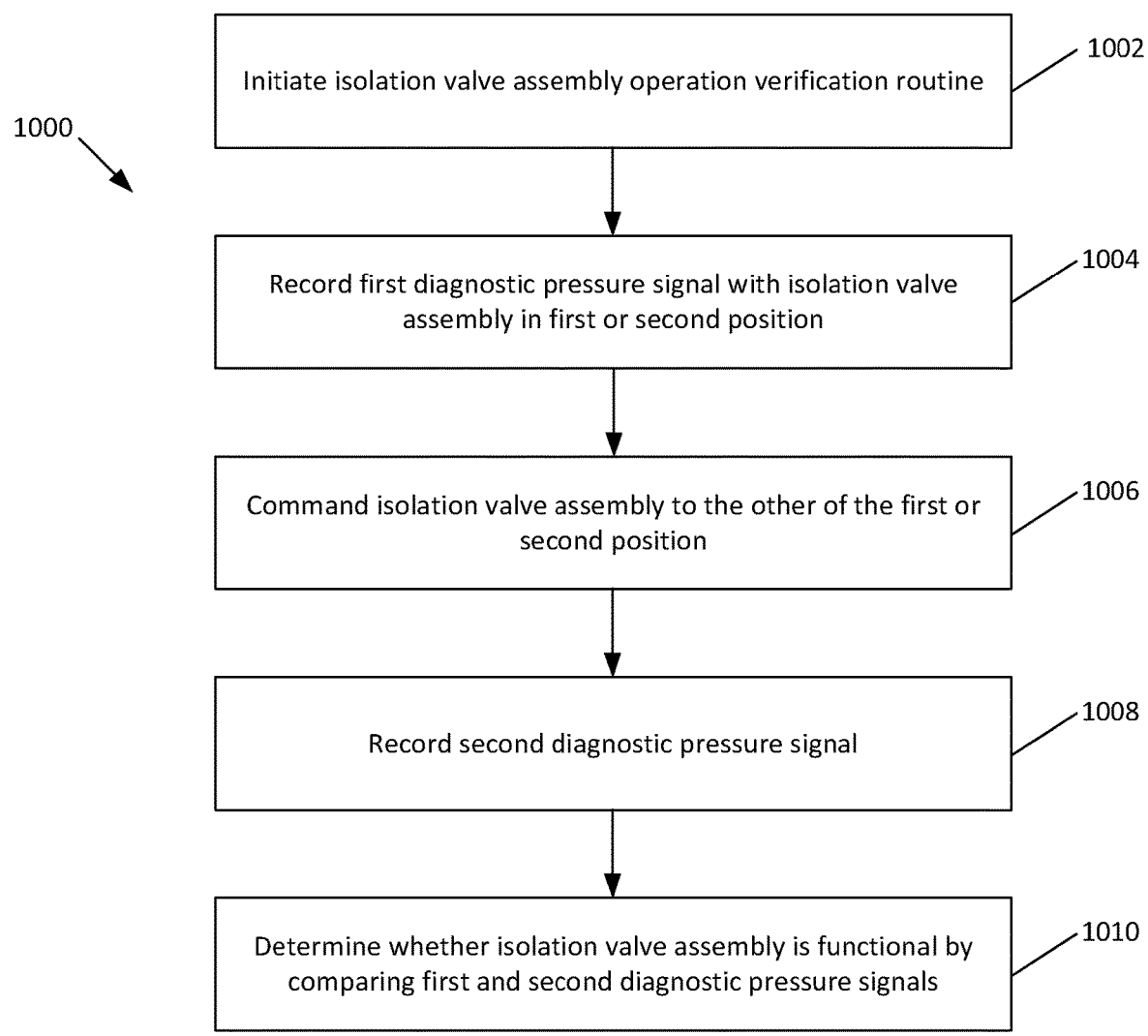
FIG. 6 is a flow chart showing a process for detecting the functional state of an isolation for the system shown in FIGS. 2 and 4.

In one aspect, the work machine 10 can be provided with a control system to operate the aspects of the hydraulic system, as shown schematically at FIGS. 2, 4, and 5. In one aspect, the control system includes a controller 50 that receives input signals and generates output signals for controlling the work machine 10. In the example presented, the controller 50 is only shown as receiving inputs and sending outputs in relation to the isolation valve assembly 104. However, a skilled person will appreciate that the other control functions of the work machine 10 (e.g. control of pump 20, work circuit 200, valve assemblies 102, 106, 108, etc.) can be incorporated into the controller 50, or that the functions relating to the isolation valve assembly 104, described below, can be incorporated into a larger system controller that controls all functions of the work machine 10.

Referring to FIG. 3, the electronic controller 50 is schematically shown as including a processor 50A and a non-transient storage medium or memory 50B, such as RAM, flash drive or a hard drive. Memory 50B is for storing executable code, the operating parameters, the input from the operator interface while processor 50A is for executing the code.

Electronic controller 50 may have a number of inputs and outputs that may be used for operating the isolation valve assembly 104. For example, inputs and outputs may be in the form of pressure and position sensors. Other examples of inputs are vehicle status, engine status/speed, pump status/displacement/demand, and the positions of the other valve assemblies, which may be provided as a direct inputs into the electronic controller 50 or may be received from another portion of the control system via a control area network (CAN). One input into the electronic controller 50 is the diagnostic pressure signal 52 received from the pressure sensor 112 of the isolation valve assembly 104. One output from the electronic controller 50 is the isolation valve position signal 54 sent to either the actuator 104j or 105d, depending upon the configuration of the system.

The electronic controller 50 may also include a number of algorithms or control schemes to correlate the inputs and outputs of the controller 50. In one embodiment, the controller 50 includes an algorithm to verify functionality of the isolation valve assembly 104, as described further in the Method of Operation section below. The electronic controller 50 may also store a number of predefined and/or configurable parameters and offsets for such purposes. As used herein, the term "-configurable" refers to a parameter or offset value that can either be selected in the controller (i.e. via a dipswitch) or that can be adjusted within the controller.

Method of Operation

Referring to FIG. 4, the operation 1000 of the isolation valve assembly 104 is shown. In an initial step 1002, an isolation valve assembly operation verification algorithm or routine is initiated. This step can be performed automatically by the system or upon request, for example by a user input. When the isolation valve assembly 104 is in its biased state in position B, for example before or shortly after the work machine 10 or the circuit associated with the isolation valve assembly 104 is activated, the controller 50 receives and records the diagnostic pressure signal 52 sensed at the pressure sensor 112. For purposes herein, this reading can be referred to as the first reference pressure signal and is shown as being performed at step 1004 in FIG. 4. As explained previously, when the isolation valve assembly 104 is in position B, the ports 104a and 104g are connected to each other such that the pressure sensor 112 is in fluid communication with the reservoir or tank. Accordingly, the first reference pressure signal will generally correspond to the hydraulic pressure at the reservoir or tank.

After the first reference pressure signal is obtained, the controller 50 moves the isolation valve assembly 104 to the position A by sending an output signal to the actuator 104j or 105d in a step 1006.

Once the isolation valve assembly 104 is in the position A, the controller 50 receives and records the diagnostic pressure signal 52 sensed at the pressure sensor 112 at a step 1008. For purposes herein, this reading can be referred to as the second reference pressure signal. As explained previously, in position A of the isolation valve assembly 104, the ports 104b and 104e are connected to each other such that the pressure sensor 112 is in fluid communication with the downstream side of the pressure reducing valve 110. In general terms, the pressure reducing valve 110 reduces the fluid pressure supplied by the pump 20, for example down to a pressure of about 20 bar, and provides a relatively more constant fluid pressure to the downstream components. Accordingly, the second reference pressure signal generally can be expected to be equal to the downstream pressure at the pressure reducing valve 110.

In a step 1010, the first and second reference pressure signals are compared to each other. In one example, if the system and isolation valve assembly 104 are operating correctly, the second reference pressure signal should be well above the first second reference pressure signal, for example a difference of 20 bar could be anticipated. In instances where the isolation valve assembly 104 has failed into either position A or B and does not move to the commanded position, the difference between the first and second pressure signals would resultantly be zero as the pressure sensor 112 will simply be reading the same signal in both instances. Accordingly, the proper operation of the isolation valve assembly 104 can be verified by observing the difference between the first and second reference pressure signals. In one example, a threshold difference value is defined such that when the difference between the first and second reference pressure signals is equal to or above the threshold difference value, the isolation valve assembly 104 can be identified as operating properly and such that when the difference between the first and second reference pressure signals is below the threshold difference value, the isolation valve assembly 104 can be identified as not having opened and in a failure state. The threshold difference value can be a fixed value or a calculated value.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic circuit comprising:
   (a) an actuator having first and second ports;
   (b) a metering valve assembly for controlling hydraulic flow into and out of the first and second ports; and
   (c) an isolation valve assembly located between the actuator and the metering valve assembly, the isolation valve assembly including a first inlet port configured for fluid communication with a pressure source of the hydraulic circuit, a second inlet port configured for connection with a reservoir of the hydraulic circuit, and a pressure sensing port configured for connection with a pressure sensor;
   (d) wherein the isolation valve assembly is movable between a first position, in which fluid flow between the metering valve and the actuator is enabled, and a second position, in which fluid flow between the metering valve and the actuator is blocked, and wherein the isolation valve assembly is spring biased into the second position;
   (e) wherein when the isolation valve assembly is moved to one of the first and second positions, the first inlet port and the pressure sensing port are placed in fluid communication with each other, and wherein when the isolation valve assembly is moved to the other of the first or second position, the second inlet port and the pressure sensing port are placed in fluid communication.

2. The hydraulic circuit of claim 1, wherein the isolation valve assembly is a spool valve assembly.

3. The hydraulic circuit of claim 1, wherein when the isolation valve assembly is moved to the first position, the first inlet port and the pressure sensing port are placed in fluid communication with each other and wherein when the isolation valve assembly is moved to the second position, the second inlet port and the pressure sensing port are placed in fluid communication.

4. The hydraulic circuit of claim 1, wherein the isolation valve assembly is actuated towards the second position by a solenoid actuator.

5. The hydraulic circuit of claim 1, wherein the isolation valve assembly further includes a pilot valve assembly for selectively directing pressurized fluid to move the isolation valve assembly towards the second position.

6. The hydraulic circuit of claim 1, further including a pressure sensor connected to the pressure sensing port.

7. An isolation valve assembly for use in a hydraulic circuit, the isolation valve assembly comprising:
   (a) first and second ports configured for fluid communication with a metering valve assembly;
   (b) third and fourth ports configured for fluid communication with an actuator;
   (c) a fifth port configured for fluid communication with a pump side of the hydraulic circuit;
   (d) a sixth port configured for fluid communication with a reservoir side of the hydraulic circuit; and
   (e) a seventh port configured for fluid communication with a pressure sensor;
   (f) wherein when the isolation valve is in a first position, the first and third ports are placed in fluid communication with each other, the second and fourth ports are placed in fluid communication with each other, the fifth and seventh ports are placed in fluid communication with each other, and the sixth port is blocked;
   (g) wherein when the isolation valve is in a second position, the first through fifth ports are blocked and the sixth and seventh ports are placed in fluid communication with each other.

8. The isolation valve assembly of claim 7, wherein the isolation valve assembly is a spool and sleeve type valve.

9. The isolation valve assembly of claim 7, wherein the isolation valve assembly is spring biased towards the second position.

10. A method for determining a functional state of an isolation valve assembly, the method comprising the steps of:

(a) providing an isolation valve assembly in a hydraulic circuit that is movable between a first position in which fluid flow between a metering valve and an actuator is enabled and a second position in which fluid flow between the metering valve and the actuator is blocked;
(b) initiating an operation verification routine for the isolation valve assembly;
(c) reading a first diagnostic pressure value with the isolation valve assembly in the first position;
(d) moving the isolation valve assembly to the second position;
(e) reading a second diagnostic pressure value with the isolation valve assembly in the second position; and
(f) determining whether the isolation valve assembly is functional by comparing the first diagnostic pressure value to the second diagnostic pressure value.

11. The method of claim 10, wherein the first position corresponds to a position in which the isolation valve assembly blocks flow between the metering valve and the actuator.

12. The method of claim 11, wherein the second position corresponds to a position in which the isolation valve assembly enables flow between the metering valve and the actuator.

13. The method of claim 10, wherein the step of reading a first diagnostic pressure value includes sensing a pressure associated with a reservoir of the hydraulic circuit.

14. The method of claim 13, wherein the step of reading a second diagnostic pressure value includes sensing a pressure associated with a pump side of the hydraulic circuit.

15. The method of claim 14, wherein the first position corresponds to a position in which the isolation valve assembly blocks flow between the metering valve and the actuator and the second position corresponds to a position in which the isolation valve assembly enables flow between the metering valve and the actuator.

16. The method of claim 10, wherein the determining step includes comparing the difference between the first and second diagnostic pressure values.

17. The method of claim 16, wherein the determining whether the isolation valve assembly is functional includes identifying the isolation valve assembly as being in a failed state when the difference between the first and second diagnostic pressure values is below a threshold value.

18. The method of claim 17, wherein the threshold is a predetermined threshold value.

* * * * *